United States Patent Office 3,260,180
Patented July 12, 1966

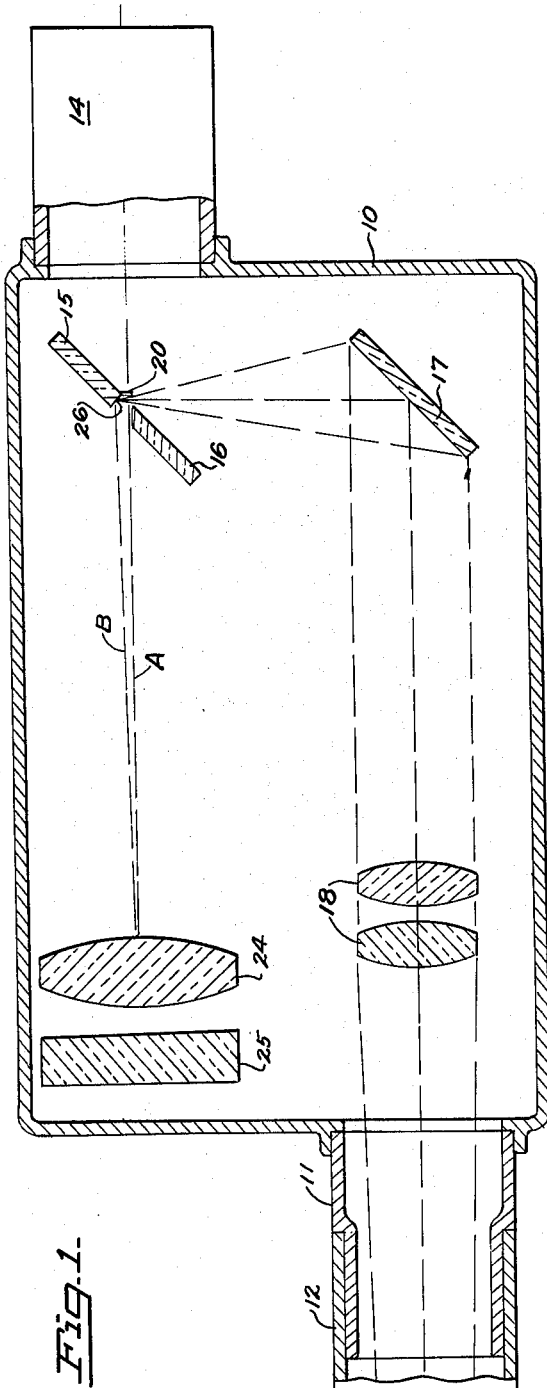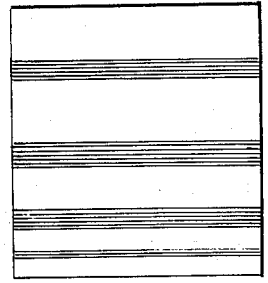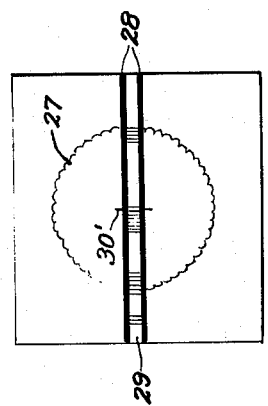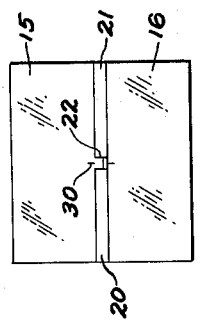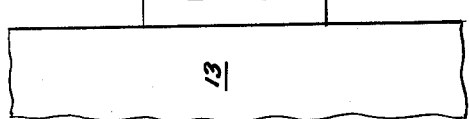

3,260,180
SPECTRAL DISPERSION ATTACHMENT FOR CAMERAS
Lawrence R. Teeple, Jr., Palo Alto, Calif., assignor to Beckman & Whitley, Inc., San Carlos, Calif., a corporation of Delaware
Filed Jan. 27, 1964, Ser. No. 340,455
7 Claims. (Cl. 95—1.1)

The present invention relates to a device for producing a spectrographic record on film simultaneously with the production of a photographic record on the same film of the same event from which the spectrographic record is made.

When it is desirable to produce a photographic image of an event which is luminous, it is often also desirable to make a spectrographic analysis thereof.

It is an object of the present invention to provide means for use with cameras of known kind to sample and make a spectral dispersion of radiation from an event as it is being recorded by the camera and to focus said dispersion through the optical system of the camera coincidentally with the image of the event and thus produce a spectrogram on the film precisely related with the record of the event.

Further objects and many advantages of the invention will be come apparent from the ensuing description wherein reference is made to the accompanying drawings.

In the drawings:

FIG. 1 is a schematic view in side elevation of a spectral dispersion unit embodying the present invention;

FIG. 2 is a view in elevation of a combined mirror and spectral slit mask;

FIG. 3 is a schematic representation of a combined photograph and spectrogram produced by the device of the present invention; and FIG. 4 represents a time resolved streak type spectrum exposure made simultaneously with the exposure of several frames like FIG. 3.

The unit of the present invention is contained in a housing 10 having a tubular outlet for a focused beam of light shown at 11 and adapted to fit within the objective barrel 12 of a camera, a part of which is illustrated at 13. A focused beam of light containing the image of an event or object to be recorded enters the housing 10 through an objective system, not shown, but contained in a barrel 14. The image is focused at the center of a mirror surface formed by two mirrors 15 and 16 disposed at an angle of 45° to the axis of the beam and reflected to a third mirror 17. The mirror 17 directs the beam through a relay lens system 18 and into the camera 13 with its own optical system, not shown.

In accordance with the present invention a sample or pencil of light or radiation for the projection of a spectrogram is permitted to pass from the image between the mirrors 15 and 16 and a pair of flat mask elements 20 and 21, best shown in FIG. 2, spaced to provide a spectral slit 22 centrally of the space between the mirrors. This slit is arranged at the plane of the primary image so that a small beam or sample of said image or radiation therefrom passes beyond the plane of the mirrors through a combination collimating and collecting lens 24 to impinge on a reflecting type grating 25 of a type well known in the art of spectroscopy. An image of the dispersion created by the grating is reflected back thereby through the lens 24 and focused by a mirror surface 26 on the lower edge of the mirror 15. The image is formed just beyond the surface 26 and on a plane intersecting the plane of the mirrors 15 and 16. The grating 25 is disposed at a slight angle in the order of one quarter of one degree, more or less, so that the sample or beam impinging on the grating has the axis indicated by the broken line A while the beam carrying the spectroscopic dispersion is reflected back on the axis B to impinge on the mirror surface 26 by which it is reflected to the mirror 17 and thence through the relay lenses 18 and into the camera.

As is shown in FIG. 1, the upper edge of the back of mirror 16 is beveled or cut away to reveal the entire length of the mirrored edge 26. Since the mask elements 20 and 21 are disposed at the primary image plane and substantially absorb illumination, they result in a narrow band unexposed on the film, as indicated at 28 in FIG. 3. Thus the area of this band is exposed only by light from the grating 25 so that a spectrogram occurs on the film as shown at 29.

The precise area of the event being recorded or of the image from which the spectrographic record is made can be determined by small reference lines on the mirror surfaces shown at 30 in FIG. 2 which will be reproduced on the film indicating the position of the slit 22. In FIG. 3, the band 28 and spectrogram 29 are shown as wider than normal for the sake of clarity. Also it should be understood that FIG. 3 represents one of a series of framed exposures of a luminous event such as a burning bridge wire or detonated explosive charge, the image of the event being represented at 27. The precise location from which the isolated radiation was selected to produce the spectrogram 29 is shown by the intersection therewith of the image 30' of the reference lines 30 on the mirrors of FIG. 2.

The results so far described may be obtained by the use of many types of high speed framing cameras occupying the position of the camera shown at 13 in FIG. 1. It is possible, however, to produce simultaneously a time resolved exposure of the spectrogram by employing a combination streak and framing camera such as that disclosed in my application for United States Letters Patent, Serial No. 93,200, filed March 3, 1961, now Patent No. 3,143,051, and known commercially as the Beckman & Whitley No. 200 Camera. Briefly, the camera referred to is one which employs a light splitter and a rotating mirror. In this camera, one-half of the light containing an image of an event to be recorded, is directed in one path toward the mirror and reflected by the mirror through a lens system and onto a film which records a series of framed exposures spaced in time. Simultaneously the other half of the light is directed to the same mirror from a different angle so that it is reflected toward a different film for creating a streak type exposure. By using such a camera in the position of the camera 13 of FIG. 1, a time resolved exposure of the spectrogram shown in FIG. 3 is produced, as indicated at 30 in FIG. 4, for comparative study with a group of framed records made of the same event during the same period of time.

I claim:

1. Means for use with a camera for producing a framed record of an event which comprises means for simultaneously isolating a portion of radiation from the event, means for producing a spectrograph of said radiation, and means for transmitting light from the spectrograph along the optical axis used in producing the framed record to produce a spectrogram superimposed on the same record.

2. The combination of claim 1 with means to indicate on the record the position on the object recorded from which the isolated radiation was selected.

3. Means for use with a camera to produce a record on film of an event and a spectrogram on the same film of the same event comprising a mirror surface intercepting a focused beam containing an image of an event and directing it in an optical path to film in the camera, a small aperture at said mirror surface, a grating positioned to intercept a beam containing a part of the image passing through said aperture and to produce a spectrographic image, and optical means to focus and direct said spectrographic image into said same path to the film.

4. The combination of claim 3 in which said mirror surface is formed by two mirrors spaced apart to form a slit, and masking elements cooperate with the slit to produce the small aperture.

5. The combination of claim 4 in which said optical means includes a second mirror surface behind and adjacent said masking elements and disposed to receive and reflect the spectrographic image through the slit and into said optical path.

6. The combination of claim 4 in which the surface of at least one mirror is marked adjacent the aperture to produce a reference line on the film when it has been exposed.

7. The combination of claim 4 in which the masking elements are disposed to cause a narrow area on the film which is not exposed by the image of the event, and means to focus the spectrographic image and record the same in said narrow area.

References Cited by the Examiner

UNITED STATES PATENTS

| | | | |
|---|---|---|---|
| 2,252,508 | 8/1941 | Hoff | 88—14 X |
| 2,960,380 | 11/1960 | Edgerton | 95—11.5 X |
| 3,143,051 | 8/1964 | Teeple | 352—84 X |

JOHN M. HORAN, *Primary Examiner.*